(12) United States Patent
Sasaki et al.

(10) Patent No.: US 7,377,355 B2
(45) Date of Patent: May 27, 2008

(54) MOTOR-DRIVEN POWER STEERING APPARATUS FOR A VEHICLE

(75) Inventors: Yutaka Sasaki, Tochigi (JP); Katsuyuki Yoshida, Tochigi (JP)

(73) Assignee: Showa Corporation, Saitama (JP)

( * ) Notice: Subject to any disclaimer, the term of this patent is extended or adjusted under 35 U.S.C. 154(b) by 204 days.

(21) Appl. No.: 11/005,777

(22) Filed: Dec. 7, 2004

(65) Prior Publication Data
US 2005/0274566 A1 Dec. 15, 2005

(30) Foreign Application Priority Data
Jun. 15, 2004 (JP) ............................. 2004-177564

(51) Int. Cl.
*B62D 5/06* (2006.01)
*F16H 1/16* (2006.01)
(52) U.S. Cl. ............... 180/444; 180/426; 180/443; 74/425; 74/462; 74/457; 74/388 PS; 74/443
(58) Field of Classification Search ............... 180/444, 180/428, 443; 74/425, 462, 457, 443, 388 PS
See application file for complete search history.

(56) References Cited

U.S. PATENT DOCUMENTS

| 6,000,491 | A  | * | 12/1999 | Shimizu et al. | 180/444 |
| 6,691,819 | B2 | * | 2/2004  | Menjak et al.  | 180/446 |
| 6,695,092 | B2 | * | 2/2004  | Cole           | 180/444 |
| 6,817,439 | B2 | * | 11/2004 | Gillman et al. | 180/443 |
| 6,854,559 | B2 | * | 2/2005  | Kurishige et al. | 180/446 |
| 6,949,901 | B1 | * | 9/2005  | Collier-Hallman et al. | 318/432 |
| 6,959,781 | B2 | * | 11/2005 | Shimizu et al. | 180/444 |

OTHER PUBLICATIONS

Japanese Patent Application Laid-open No. 2001-278077, Oct. 10, 2001.

* cited by examiner

*Primary Examiner*—Lesley D. Morris
*Assistant Examiner*—Marlon Arce-Diaz
(74) *Attorney, Agent, or Firm*—Orum & Roth LLC (57) ABSTRACT

In a motor-driven power steering apparatus for a vehicle in which a worm wheel of a worm gear type speed reduction mechanism is fixed to a pinion shaft of a rack and pinion mechanism, a direction of a torsion angle β of a helical pinion provided in the pinion shaft is set to be opposite to a direction of a tooth lead angle γ of the worm wheel.

2 Claims, 8 Drawing Sheets

MOTOR-DRIVEN POWER STEERING APPARATUS FOR A VEHICLE

BACKGROUND OF THE INVENTION

1. Field of the Invention

The present invention relates to a motor-driven power steering apparatus for a vehicle.

2. Description of the Related Art

In a motor-driven power steering apparatus for a vehicle, there is a structure made to transmit steering torque applied to a steering wheel to a pinion shaft of a rack and pinion mechanism, to transmit an auxiliary torque generated by an electric motor to the pinion shaft via a worm gear type speed reduction mechanism in correspondence to the steering torque, and to steer a steered wheel by the rack and pinion mechanism, as described in Japanese Unexamined Patent Publication No. 2001-278077 (patent document 1).

In the motor-driven power steering apparatus for the vehicle described above, there is proposed a structure in which a reaction force from a road surface is transmitted to the worm gear type speed reduction mechanism via the rack and pinion mechanism. In order to lower vibration which may cause a beating sound generated due to play between a worm wheel and a worm constituting the worm gear type speed reduction mechanism, an elastic body is interposed in an auxiliary torque transmission path of the worm gear type speed reduction mechanism and the rack and pinion mechanism.

Figure 8A:
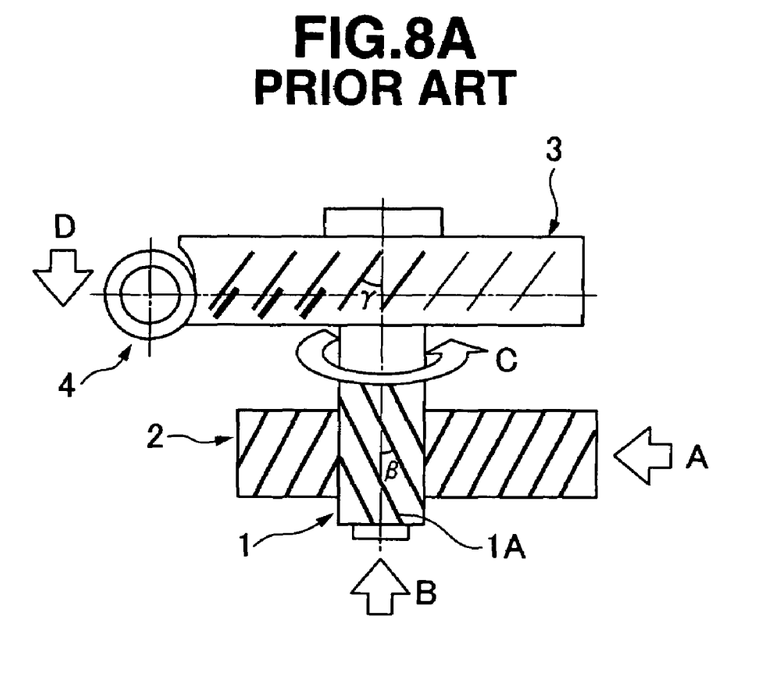
FIGS. 8A and 8B are schematic views showing a rack and pinion mechanism and a worm gear type speed reduction mechanism in accordance with the prior art.

FIG. 8A shows a conventional motor-driven power steering apparatus for a vehicle having a right-hand drive specification. Reference numeral 1 denotes a pinion shaft, reference numeral 2 denotes a rack engaging with a helical pinion 1A of the pinion shaft 1, reference numeral 3 denotes a worm wheel fixed to the pinion shaft 1, and reference numeral 4 denotes a worm engaging with the worm wheel 3. The direction of a torsion angle β of the helical pinion 1A provided in the pinion shaft 1 is set opposite to a direction of a tooth lead angle γ of the worm wheel 3. In FIG. 8A, the pinion shaft 1 and the worm wheel 3 are displaced in a direction B and are rotated in a direction C, and the worm 4 is displaced in a direction D due to a road surface reaction force A applied to the rack 2 during straight running of the vehicle. At this time, the directions B and D are opposite directions, and the worm wheel 3 and the worm 4 are displaced in a direction which reduces the play that exists between the worm wheel 3 and the worm 4 before being displaced, so that the vibration of the worm gear type speed reduction mechanism caused by the reaction force from the road surface is not amplified.

Figure 8B:
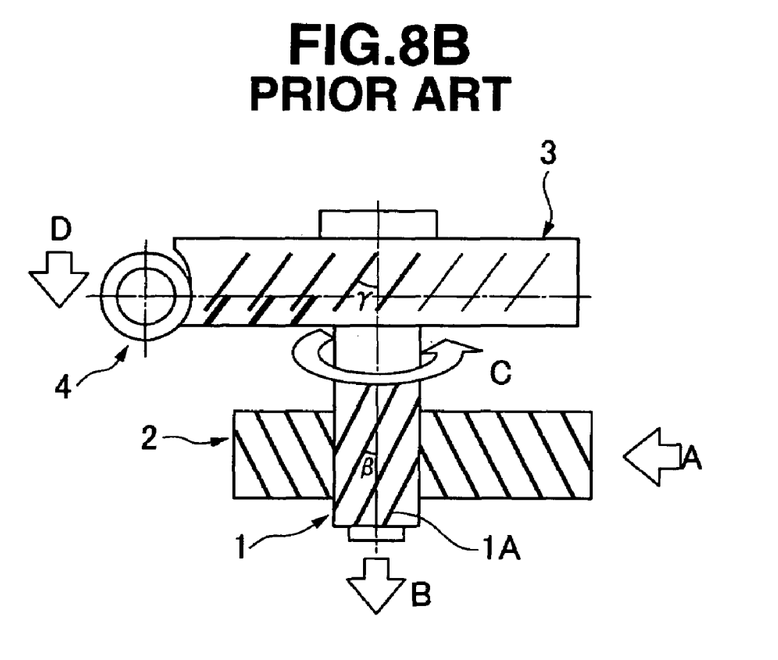

Alternatively, FIG. 8B shows a conventional motor-driven power steering apparatus for a vehicle having a left-hand drive specification. Reference numeral 1 denotes a pinion shaft, reference numeral 2 denotes a rack engagable with a helical pinion 1A of the pinion shaft 1, reference numeral 3 denotes a worm wheel fixed to the pinion shaft 1, and reference numeral 4 denotes a worm engaging with the worm wheel 3. The torsion angle β of the helical pinion 1A provided in the pinion shaft 1 is set to the same direction as the direction of a tooth lead angle γ of the worm wheel 3. In FIG. 8B, the pinion shaft 1 and the worm wheel 3 are displaced in a direction B and are rotated in a direction C. Worm 4 is displaced in a direction D due to a road surface reaction force A applied to the rack 2 during a straight running of the vehicle. At this time, the directions B and D are same, and the worm wheel 3 and the worm 4 are displaced in a direction that increases the play existing between the worm wheel 3 and the worm 4 before being displaced, so that the vibration of the worm gear type speed reduction mechanism caused by the reaction force from the road surface is amplified.

In this situation, the elastic body quality deteriorates with time and can not maintain a stable vibration proofing performance, even when the elastic body in the patent document 1 is used in a vehicle having the left-hand specification of FIG. 8B. Further, this construction requires an increased number of parts.

SUMMARY OF THE INVENTION

An object of the present invention is to secure stable vibration reducing performance with respect to a road surface reaction force on the basis of a simple structure in both a vehicle having a left-hand specification and a vehicle having a right-hand specification, in a motor-driven power steering apparatus for a vehicle.

The present invention relates to a motor-driven power steering apparatus transmitting a steering torque applied to a steering wheel to a pinion shaft of a rack and pinion mechanism, transmitting an auxiliary torque generated by the electric motor to said pinion shaft via a worm gear type speed reduction mechanism in correspondence to said steering torque, and fixing a worm wheel of said worm gear type speed reduction mechanism to said pinion shaft during steering a steered of wheel by said rack and pinion mechanism.

In a vehicle having a left-hand specification, the direction of the torsion angle of a helical pinion provided in said pinion shaft is set opposite to a direction of a tooth lead angle of said worm wheel.

Further, the present invention relates to a motor-driven power steering apparatus which transmits steering torque applied to a steering wheel to a pinion shaft of a rack and pinion mechanism, transmitting an auxiliary torque generated by the electric motor to said pinion shaft via a worm gear type speed reduction mechanism in correspondence to said steering torque, and fixing a worm wheel of said worm gear type speed reduction mechanism to said pinion shaft during steering of a steered wheel by said rack and pinion mechanism.

The direction of a torsion angle of a helical pinion provided in said pinion shaft is set opposite to a direction of a tooth lead angle of said worm wheel, in both of a vehicle having a left-hand specification and a vehicle having a right-hand specification.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
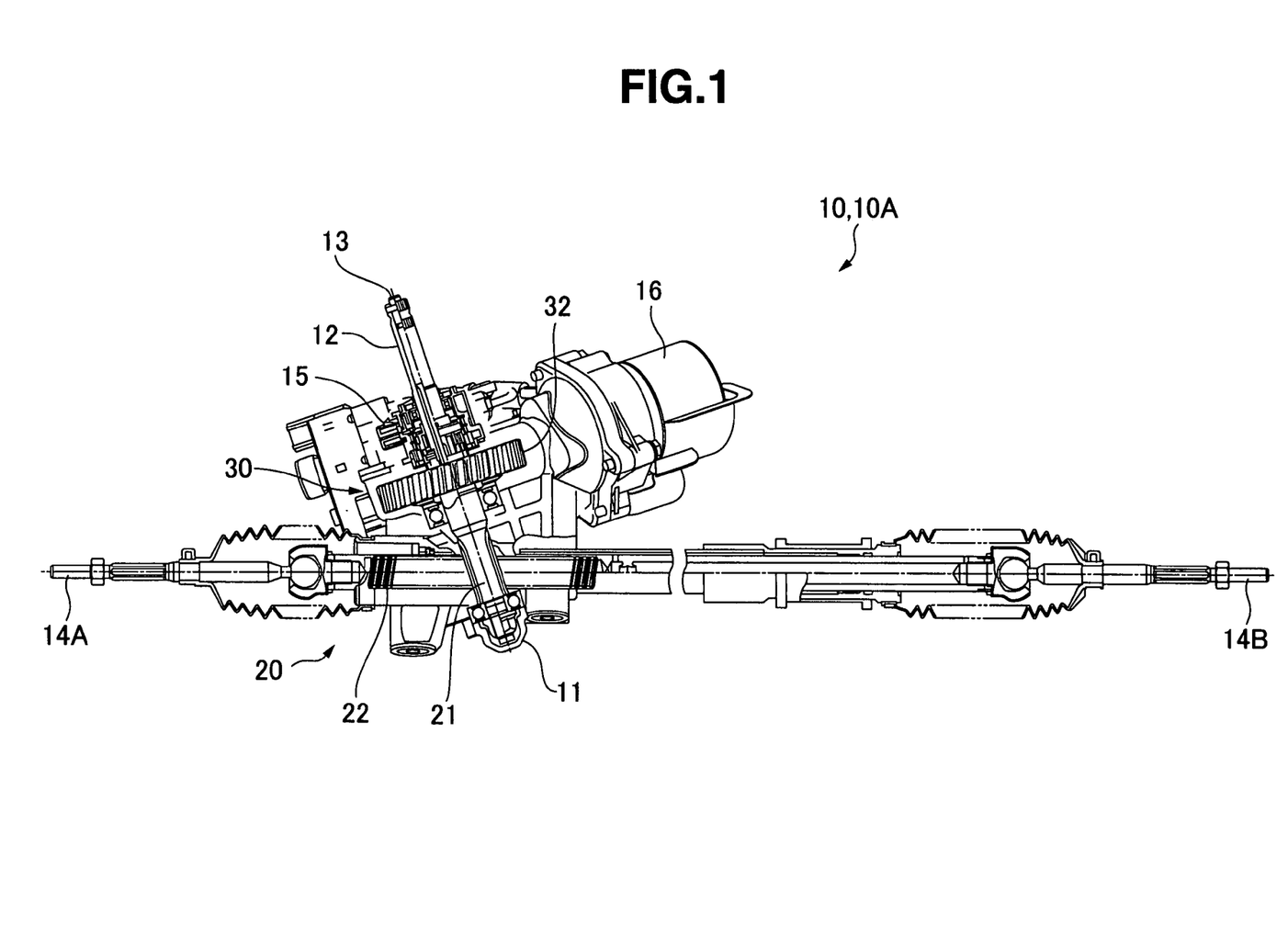
FIG. 1 is a front elevational view showing a motor-driven power steering apparatus for a vehicle having a right-hand specification.
Figure 4:
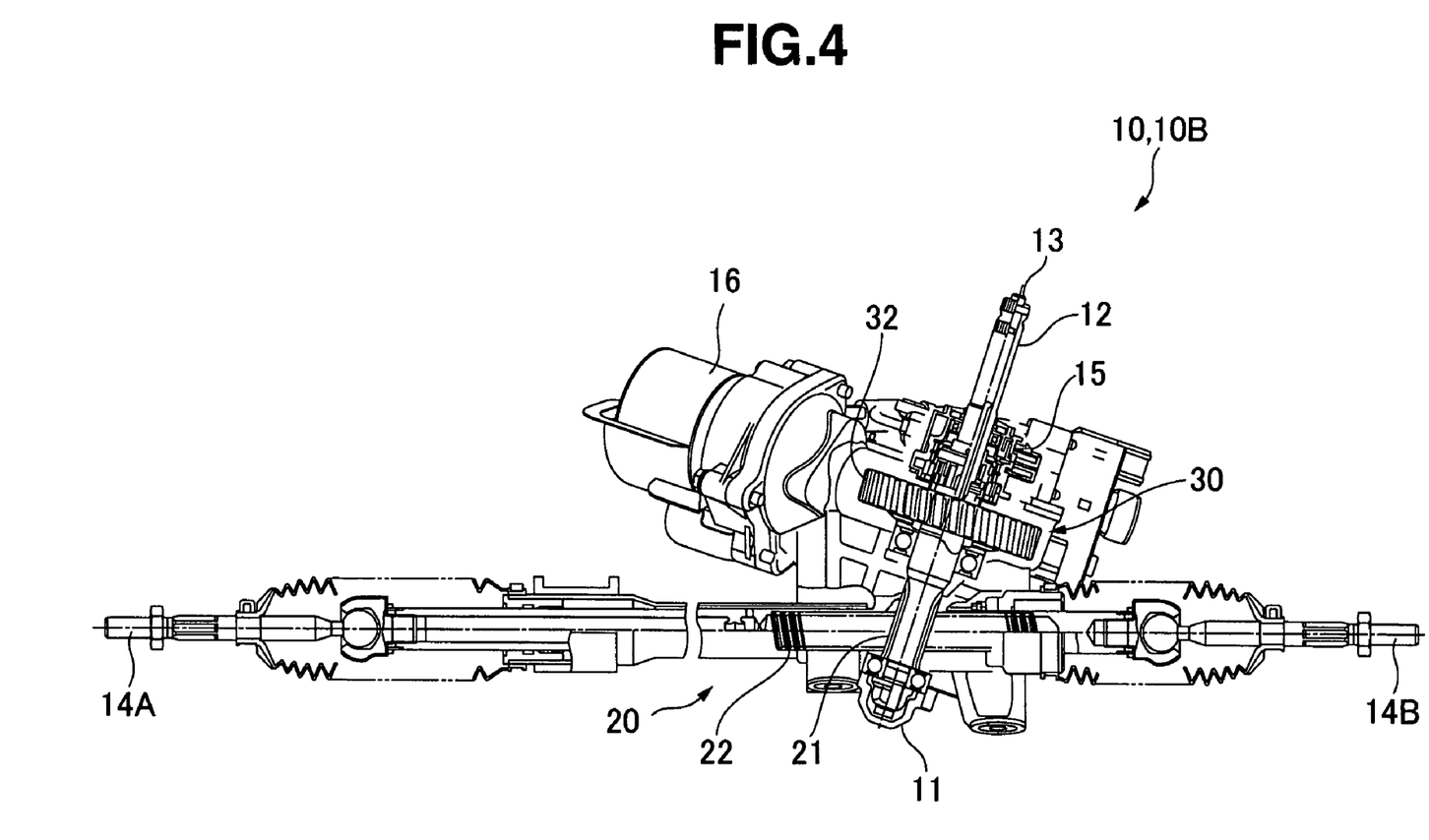
FIG. 4 is a front elevational view showing a motor-driven power steering apparatus for a vehicle having a left-hand specification.

FIGS. 1 and 4 show a front-view motor-driven power steering apparatus 10 as seen from a front side of a vehicle. Reference symbol 10A in FIG. 1 denotes a vehicle having a right-hand specification in which a steering wheel is arranged in a right seat side of the vehicle, and reference symbol 10B in FIG. 4 denotes a vehicle having a left-hand specification in which the steering wheel is arranged in a left seat side of the vehicle.

Figure 2:
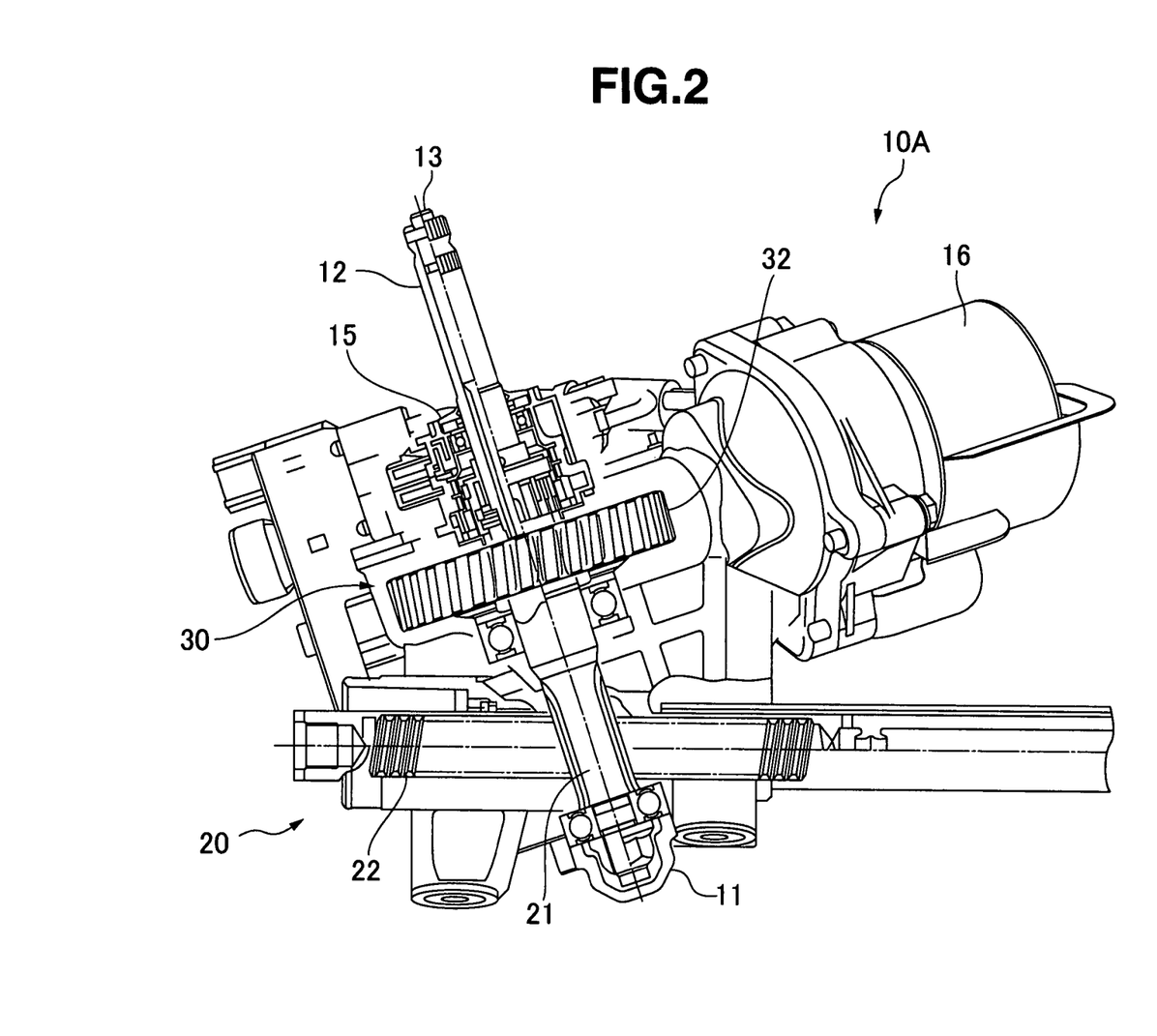
FIG. 2 is an enlarged view of a main portion in FIG. 1.

The motor-driven power steering apparatus 10A for the vehicle having the right-hand specification has an aluminum alloy gear housing 11 fixed to a vehicle body frame or the like, as shown in FIGS. 1 and 2. The motor-driven power steering apparatus 10A is structured such that a pinion shaft 21 of a rack and pinion mechanism 20 is connected to a steering shaft 12 to which the steering wheel is coupled, via a torsion bar 13. A helical pinion 21A is provided in the pinion shaft 21. A rack shaft 22 provided with a rack 22A engaging with the pinion 21A is supported by the gear housing 11 so as to freely move laterally. Right and left steered wheels are connected to the rack shaft 22 via right and left tie rods 14A and 14B. A steering torque detecting apparatus 15 is provided between the steering shaft 12 and the pinion shaft 21. In this case, the steering shaft 12 and the pinion shaft 21 are supported at the gear housing 11 via a bearing. The rack shaft 22 is slidably supported to a rack guide in one end and to the bearing at the other end.

Further, an electric motor 16 is fixed to the gear housing 11, and an assist shaft is connected to a rotating shaft of the electric motor 16 by a spline fitting portion. Both ends of the assist shaft are supported at the gear housing 11 by side bearings such as a ball bearing or the like. Further, a worm 31 of a worm gear type speed reduction mechanism 30 is connected to an intermediate portion pinched by both side bearings of the assist shaft, and a worm wheel 32 engaging with the worm 31 is fixed to an intermediate portion of the pinion shaft 21.

The rack and pinion mechanism 20 is comprised of the pinion shaft 21, the pinion 21A, the rack shaft 22 and the rack 22A. The worm gear type speed reduction mechanism 30 is comprised of the worm 31 and the worm wheel 32.

When steering a steered wheel by the rack and pinion mechanism 20, the following occurs. The motor-driven power steering apparatus 10A for a vehicle having a right-hand specification transmits steering torque applied to the steering wheel to the pinion shaft 21 of the rack and pinion mechanism 20, transmits auxiliary torque generated by the electric motor 16 to the pinion shaft 21 via the worm gear type speed reduction mechanism 30 in correspondence to the steering torque, and fixes the worm wheel 32 of the worm gear type speed reduction mechanism 30 to the pinion shaft 21 by the rack and pinion mechanism 20 when the steering wheel is steered.

Figure 5:
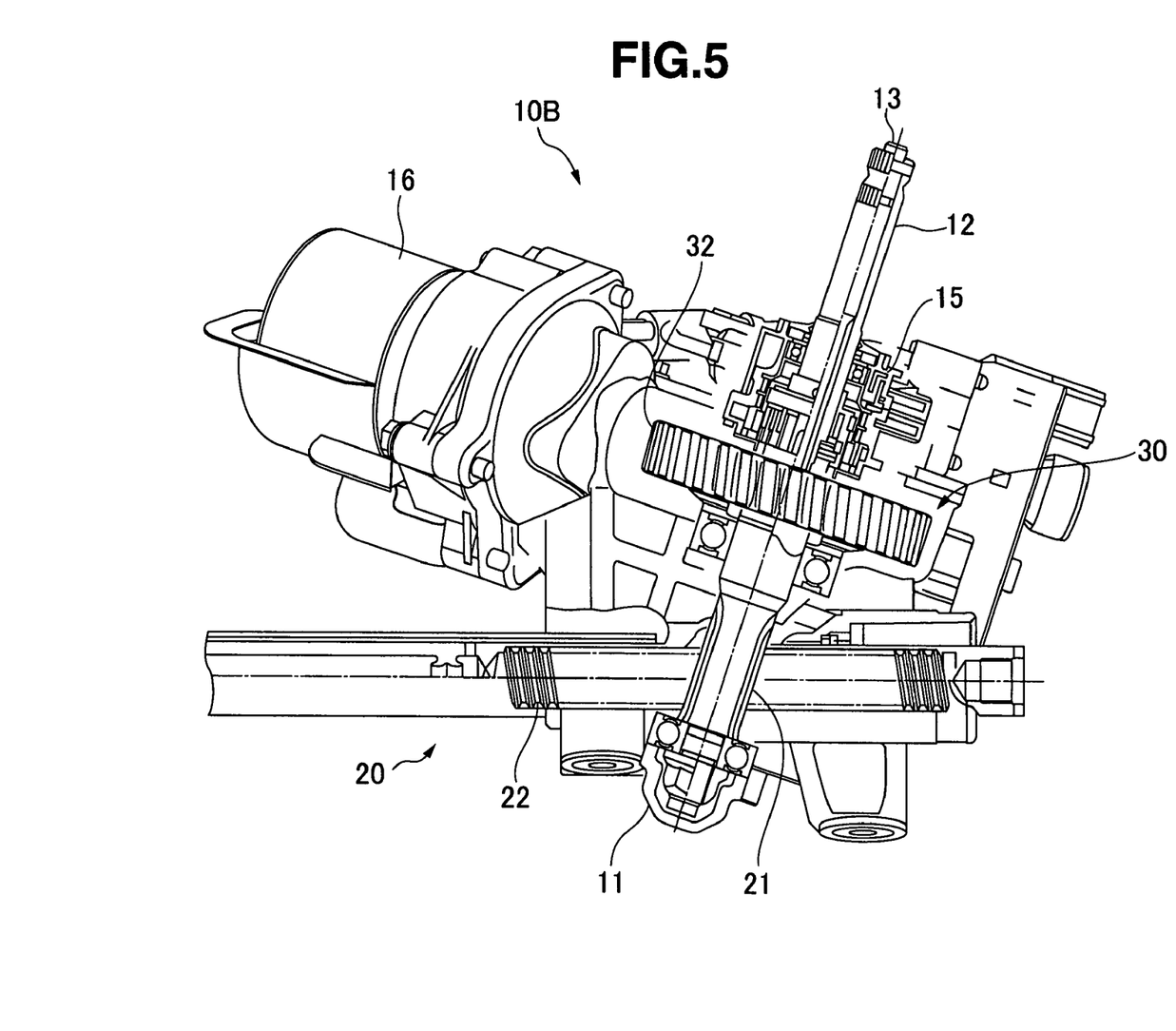
FIG. 5 is an enlarged view of a main portion in FIG. 4.

The motor-driven power steering apparatus 10B for the vehicle having the left-hand specification, is the same as the motor-driven power steering apparatus 10A for the vehicle having the right-hand specification. It has an aluminum alloy gear housing 11 fixed to a vehicle body frame or the like, as shown in FIGS. 4 and 5. The motor-driven power steering apparatus 10B is structured such that a pinion shaft 21 of a rack and pinion mechanism 20 is connected to a steering shaft 12 to which the steering wheel is coupled, via a torsion bar 13. Helical pinion 21A is provided in the pinion shaft 21. A rack shaft 22 provided with a rack 22A engaging with the pinion 21A is supported to the gear housing 11 so as to freely move laterally. Right and left steered wheels are connected to the rack shaft 22 via right and left tie rods 14A and 14B. A steering torque detecting apparatus 15 is provided between the steering shaft 12 and the pinion shaft 21. In this case, the steering shaft 12 and the pinion shaft 21 are supported at the gear housing 11 via a bearing. The rack shaft 22 is slidably supported to a rack guide in one end and to the bearing at the other end.

Further, an electric motor 16 is fixed to the gear housing 11. An assist shaft is connected to a rotating shaft of the electric motor 16 by a spline fitting portion, the assist shaft is supported at the gear housing 11 in both ends by side bearings such as a ball bearing or the like. A worm 31 of a worm gear type speed reduction mechanism 30 is connected to an intermediate portion pinched by both side bearings of the assist shaft, and a worm wheel 32 engaging with the worm 31 is fixed to an intermediate portion of the pinion shaft 21.

When steering a steered wheel by the rack and pinion mechanism 20, the following occurs. The motor-driven power steering apparatus 10B for the vehicle having a left-hand specification transmits a steering torque applied to the steering wheel to the pinion shaft 21 of the rack and pinion mechanism 20, transmits an auxiliary torque generated by the electric motor 16 to the pinion shaft 21 via the worm gear type speed reduction mechanism 30 in correspondence to the steering torque, and fixes the worm wheel 32 of the worm gear type speed reduction mechanism 30 to the pinion shaft 21. In the motor-driven power steering apparatus 10A for a vehicle having a right-hand specification and the motor-driven power steering apparatus 10B for the vehicle having a left-hand specification, the rack and pinion mechanism 20 and the worm gear type speed reduction mechanism 30 are structured as follows.

Figure 3A:
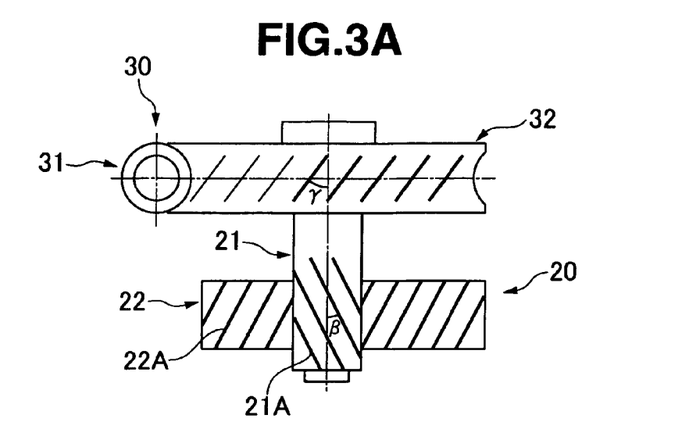
FIGS. 3A to 3C are schematic views showing a rack and pinion mechanism and a worm gear type speed reduction mechanism in conjunction with the main portion in FIG. 2.

(A) Rack and pinion mechanism 20 and worm gear type speed reduction mechanism 30 of motor-driven power steering apparatus 10A for vehicle having a right-hand specification (FIGS. 3A to 3C):

In a vehicle front elevational view in FIGS. 1 to 3C, a direction of a torsion angle $\beta$ of the helical pinion 21A provided in the pinion shaft 21 is set to be opposite to a direction of a tooth lead angle $\gamma$ of the worm wheel 32. In this case, the direction of the torsion angle $\beta$ of the helical rack 22A of the rack shaft 22 is in the same direction as the direction of the tooth lead angle $\gamma$ of the worm wheel 32, as shown in the vehicle front elevational view of FIGS. 1 to 3C.

Figure 3B:
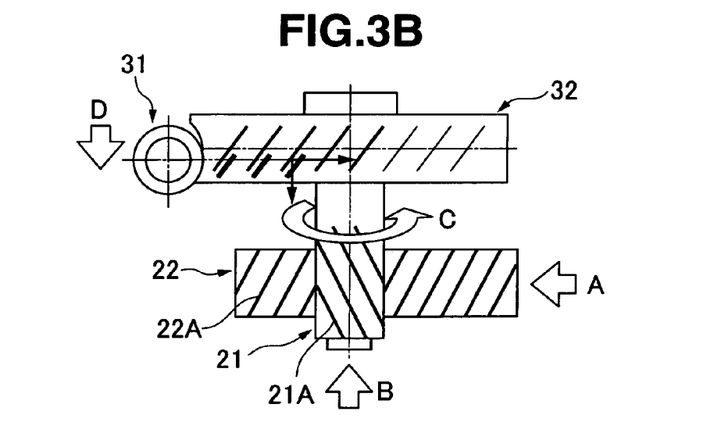
Figure 7:
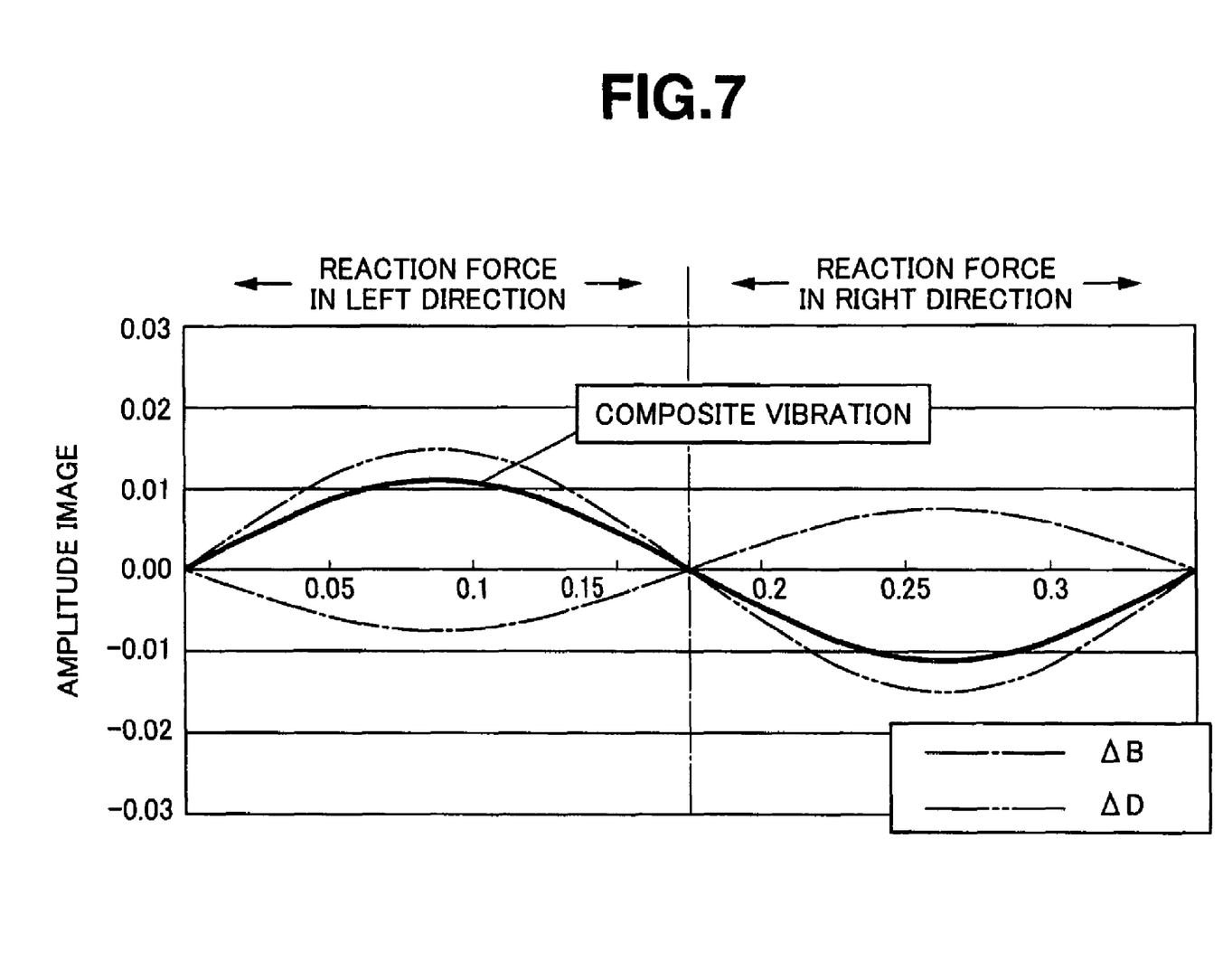
FIG. 7 is a view schematically showing a vibrating state of the worm gear type speed reduction mechanism.

As shown in FIG. 3B, when a road surface reaction force A is applied to the rack shaft 22 from a right direction during a straight running of the vehicle, the pinion shaft 21 and the worm wheel 32 are displaced at an amount $\Delta B$ in a direction B and are rotated in a direction C, and the worm 31 is displaced an amount $\Delta D$ in a direction D, due to the reaction force A. At this time, the directions B and D are opposite. The worm 31 and the worm wheel 32 are displaced in a direction that reduces the play existing between the worm wheel 31 and the worm wheel 32 before being displaced. I In other words, the worm 31 and the worm wheel 32 cancel the amounts ΔB and ΔD with each other (FIG. 7), and the vibration of the worm gear type speed reduction mechanism 30 caused by the reaction force from the road surface is attenuated.

Figure 3C:
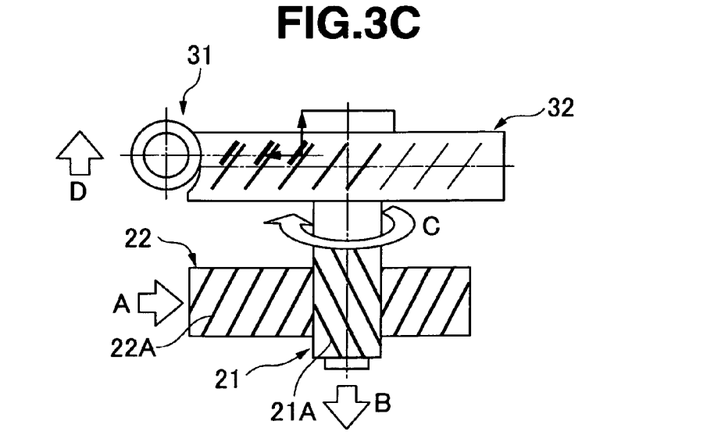

As shown in FIG. 3C, when a road surface reaction force A is applied to the rack shaft 22 from a left direction during straight running of the vehicle, the pinion shaft 21 and the worm wheel 32 are displaced an amount ΔB in a direction B and are rotated in a direction C, and the worm 31 is displaced an amount ΔD in a direction D, due to the reaction force A. Under these conditions, the directions B and D are opposite directions, the worm 31 and the worm wheel 32 are displaced in a direction that reduces play that exists between the worm wheel 31 and the worm wheel 32 before being displaced. In other words, the worm 31 and the worm wheel 32 cancel the amounts ΔB and ΔD with each other (FIG. 7), and the vibration of the worm gear type speed reduction mechanism 30 caused by the reaction force from the road surface is attenuated.

Figure 6A:
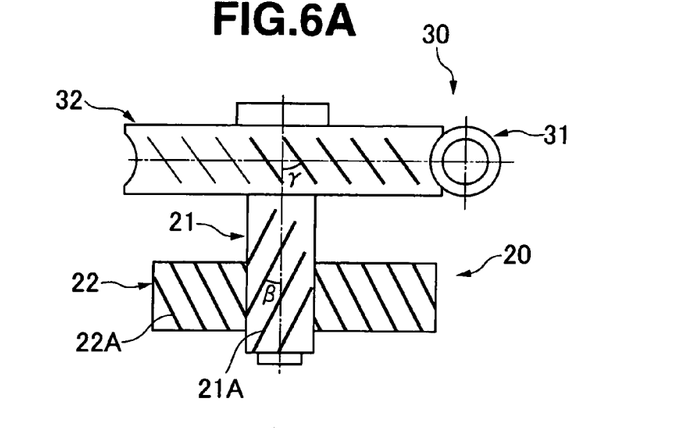
FIGS. 6A to 6C are schematic views showing a rack and pinion mechanism and a worm gear type speed reduction mechanism in conjunction with the main portion in FIG. 5.

(B) Rack and pinion mechanism 20 and worm gear type speed reduction mechanism 30 of motor-driven power steering apparatus 10B for vehicle having a left-hand specification (FIGS. 6A to 6C):

In a vehicle front elevational view in FIGS. 4 to 6C, the direction of torsion angle β of the helical pinion 21A provided in the pinion shaft 21 is set to be opposite to the direction of a tooth lead angle γ of the worm wheel 32. In this case, the direction of the torsion angle β of the helical rack 22A of the rack shaft 22 is in the same direction as the direction of the tooth lead angle γ of the worm wheel 32, as shown in the vehicle front elevational view of FIGS. 4 to 6C.

Figure 6B:
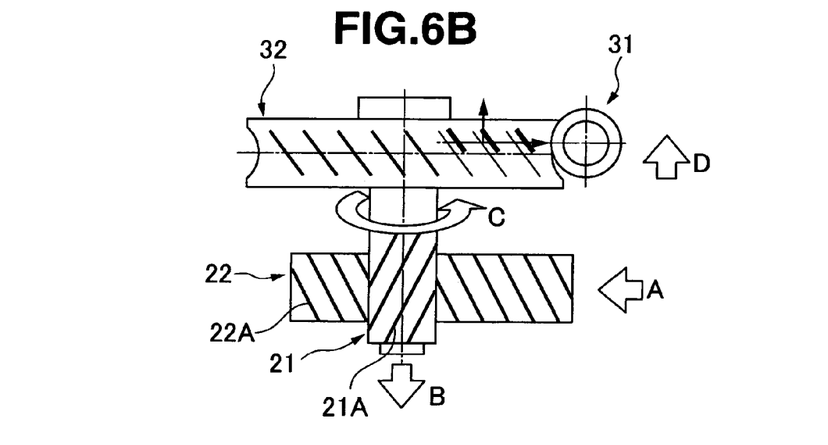

As shown in FIG. 6B, when a road surface reaction force A is applied to the rack shaft 22 from a right direction during straight running of the vehicle, the pinion shaft 21 and the worm wheel 32 are displaced in an amount ΔB in a direction B and are rotated in a direction C, and the worm 31 is displaced at an amount ΔD in a direction D, due to the reaction force A. Under these conditions, the directions B and D are opposite, the worm 31 and the worm wheel 32 are displaced in a direction that reduces the play existing between the worm wheel 31 and the worm wheel 32 before being displaced. In other words, the worm 31 and the worm wheel 32 cancel the amounts ΔB and ΔD with each other (FIG. 7), and the vibration of the worm gear type speed reduction mechanism 30 caused by the reaction force from the road surface is attenuated.

Figure 6C:
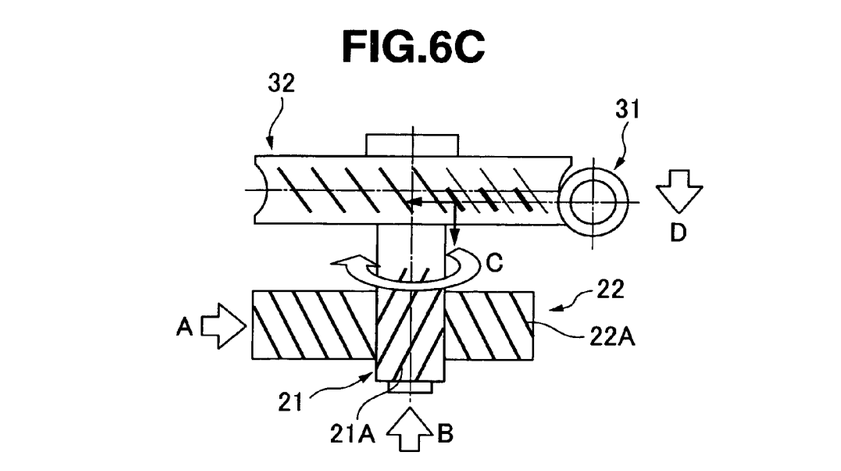

As shown in FIG. 6C, when a road surface reaction force A is applied to the rack shaft 22 from a left direction during straight running of the vehicle, the pinion shaft 21 and the worm wheel 32 are displaced an amount ΔB in a direction B and are rotated in a direction C, and the worm 31 is displaced an amount ΔD in a direction D, due to the reaction force A. Under these conditions, the directions B and D are opposite, the worm 31 and the worm wheel 32 are displaced in a direction that reduces the play existing between the worm wheel 31 and the worm wheel 32 before being displaced. In other words, the worm 31 and the worm wheel 32 cancel the amounts ΔB and ΔD with each other (FIG. 7), and the vibration of the worm gear type speed reduction mechanism 30 caused by the reaction force from the road surface is attenuated.

In accordance with the present embodiment, in both vehicles having a left-hand specification and vehicles having a right-hand specification, the pinion shaft 21 and the worm wheel 32 fixed thereto are displaced in one direction (B), and the worm 31 is displaced in the opposite direction (D), due to the road surface reaction force applied to the rack shaft 22 during straight travel of the vehicle. In other words, the worm wheel 32 and the worm 31 are displaced in a direction that reduces the play existing between the worm wheel 32 and the worm 31 before being displaced with respect to each other, and the vibration of the worm gear type speed reduction mechanism 30 caused by the reaction force from the road surface is not amplified.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus of a left-hand drive vehicle arranged and constructed to transmit a steering torque applied to a steering wheel to a pinion shaft of a rack and pinion mechanism, and arranged and constructed to transmit an auxiliary torque generated by the electric motor to said pinion shaft via a worm gear type speed reduction mechanism in correspondence to said steering torque, a worm wheel of said worm gear type speed reduction mechanism interacting with a worm element and being fixable to said pinion shaft employable during steering of a steered wheel by said rack and pinion mechanism, a direction of a torsion angle of a helical pinion provided in said pinion shaft at the portion which meshes with the rack is set to be opposite to a direction of a tooth lead angle of said worm wheel with respect to a longitudinal centerline of said pinion shaft, wherein an external force applied to said rack rotates said pinion shaft in a direction which urges the pinion shaft and attached worm wheel in a direction opposite the resulting movement of the worm element, thereby reducing play between the worm element and the worm wheel.

2. A motor-driven power steering apparatus compatible with left hand and right hand drive vehicles, arranged and constructed to transmit a steering torque applied to a steering wheel to a pinion shaft of a rack and pinion mechanism, and arranged and constructed to transmit an auxiliary torque generated by the electric motor to said pinion shaft via a worm gear type speed reduction mechanism in correspondence to said steering torque, a worm wheel of said worm gear type speed reduction mechanism interacting with a worm element and being fixable to said pinion shaft employable during steering of a steered wheel by said rack and pinion mechanism, a direction of a torsion angle of a helical pinion provided in said pinion shaft at the portion which meshes with the rack is set to be opposite to a direction of a tooth lead angle of said worm wheel with respect to a longitudinal centerline of said pinion shaft, wherein an external force applied to said rack rotates said pinion shaft in a direction which urges the pinion shaft and attached worm wheel in a direction opposite the resulting movement of the worm element, thereby reducing play between the worm element and the worm wheel.

* * * * *